UNITED STATES PATENT OFFICE 2,238,029

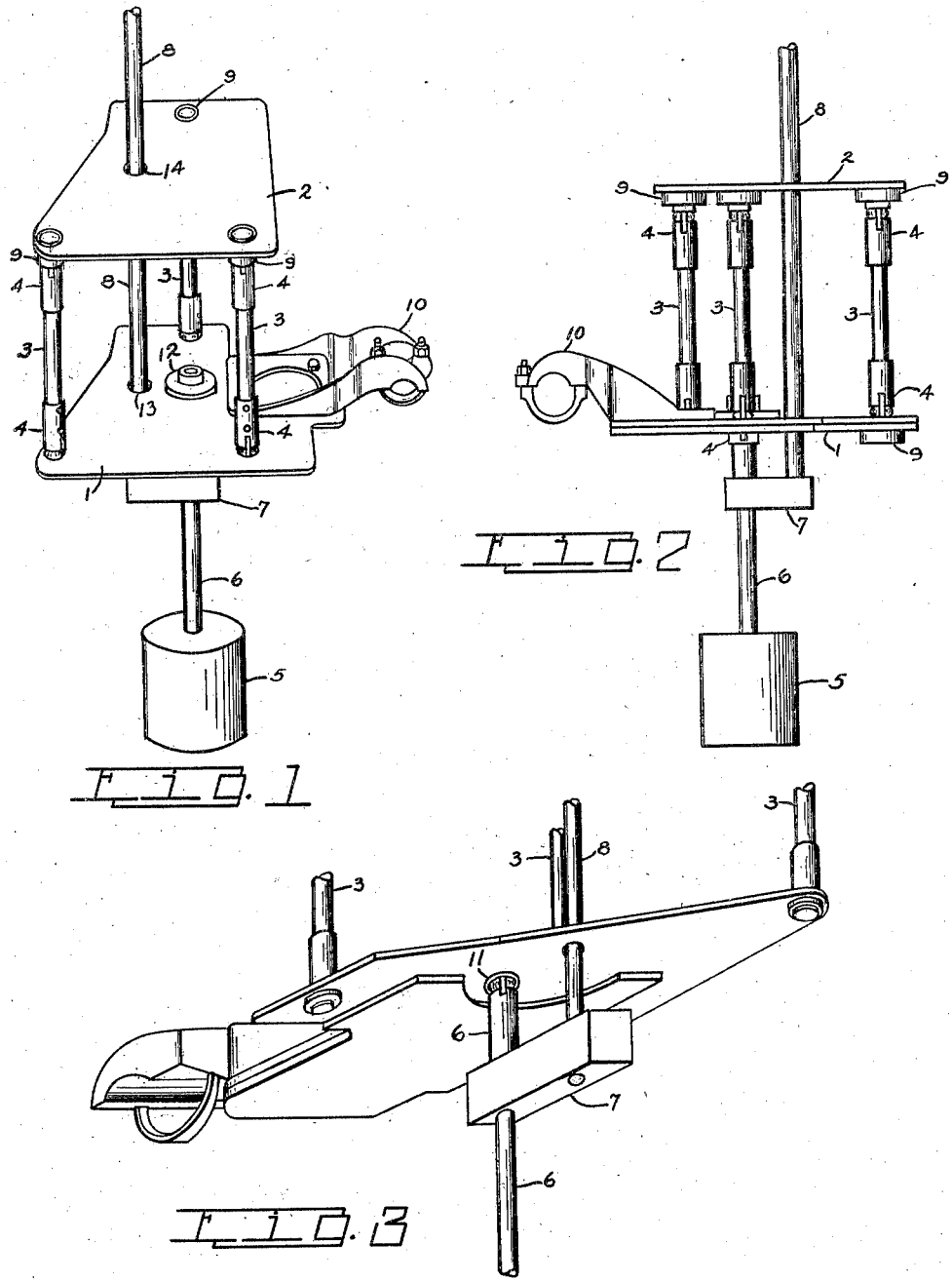

INSTRUMENT FLYING DEVICE

Norman Lee Barr, United States Navy

Application August 28, 1940, Serial No. 354,567

5 Claims. (Cl. 74—469)

(Granted under the act of March 3, 1883, as amended April 30, 1928; 370 O. G. 757)

This invention relates to a device for assisting airplane pilots engaged in instrument or "blind" flying to maintain the proper orientation of their crafts.

The last decade has brought rapid advances in aviation. Not only has it advanced in the development of more efficient aircraft, but in increased safety as well. Instruments have been perfected that enable specially trained personnel to fly with comparative safety in weather conditions that would have been very unsafe previously. Instrument flying, however, is still in its infancy and its limitations are well known to those who practice it. The number of fatal accidents that occur under instrument flying conditions compared to the number that occur during "contact" flying, bears evidence of the fact that instrument flying has not kept pace with other developments in aviation.

Basing my experiments on an understanding of the physiology of the normal human balance mechanism, and experience derived from considerable instrument flying training, I have studied hooded flight with a view to basing instrument flying on the normal physiological balance mechanism rather than on the eye, which is the weakest sensory component of the normal balance mechanism.

The physiology of equilibrium or balance

Equilibrium is a state of balance or even adjustment between opposing forces or actions. Man's equilibrium, under the influence of his normal terrestrial environment, is a state of balance or even adjustment between the forces exerted by his muscles and the force of gravity. The ability to maintain this adjustment with facility and precision is one of the innate characteristics of most animals, and particularly man. He can maintain erect posture under great strain although he is physically so top-heavy as to be very unstable. In order that he may maintain this state of balance, his brain must have a continuous flow of information concerning the relation of these opposing forces. Since the human body is flexible, and its center of gravity is continuously changing when the body is in motion, it is obvious that such information must be derived from positions throughout the body. The head, for example, being freely movable in three planes, must furnish information as to its position. And so it is that the body is provided with an intricate mechanism of balance composed of a series of systems to supply information as to the position of each separate part in relation to the opposing forces of gravity, a center to interpret this information and to give value to the necessary corrections, and a system to convey to the correcting muscles the direction and value of the forces required. The evaluating center lies in the cerebellum and has its connections with the muscles through the cerebello-rubro-spinal nerve paths. The cerebellum is brought under the influence of the cerebral cortex by the cortico-ponto-cerebellar nerve paths and enables one to follow and control the cerebellar reflexes mentally when desired. The balance mechanism is automatic and its action is continuous as long as balance is actively maintained, and it functions without the necessity of mental processes. No part of the act of maintaining equilibrium requires a mental process, although one can, if he desires, follow the act mentally. The skating instructor can execute intricate graceful figures without following the action of his body and limbs mentally, but he can, for the benefit of his student, describe separately the action of each limb in time and space. The airplane pilot has no need to follow his movements mentally while actuating the controls to perform complicated maneuvers, but he can, if he likes, follow them mentally and describe them.

The information as to the position of the body in relation to gravity, comes to the equilibratory center of the brain from three separate sources. Listed in the order of their importance as sensory components of the balance mechanism, they are: impulses from muscles, tendons and joints; labyrinthine impulses from the kinetic static labyrinth; and impulses from the eye. Tactile impulses from the skin also play some part. Each of these travels to the cerebellum over separate nerve paths. Those from muscles, tendons and joints arise in kinaesthetic nerve arborizations and pass through the proprioceptive tracts of the spinal cord, through the brain stem and to the cerebellum. This furnishes a most accurate source of information as to the position of each part. If the eyes are closed and a foot is moved actively or passively and placed behind the chair in which the subject sits, he will be able to tell the exact position of that part. If a person seats himself in a chair near a table and places the tip of the index finger about two inches above a coin on the table and closes his eyes, he can raise the elbow slowly from his side to the horizontal position without moving the tip of the finger far from its position above the coin. If he places his finger above the coin and again closes his eyes, he can rise to his feet without disturbing the relation between the tip of his finger and the coin. This, of course, requires that the angular movements at the joints be measured very accurately.

The smallest and slowest passive angular motion of the various joints that can be perceived by an individual have been measured and found to be extremely small. This is borne out by the remarkable precision with which all subjects maintain control of the airplane and trainer in all planes with the instrument of this invention.

The next source of information is in the kinetic static labyrinth, which is anatomically intimately associated with the internal ear but which is functionally entirely separate. This is a system of three semi-circular canals in an osseous framework, each perpendicular to the other two, and joined in a vestibule composed of the saccule and utricle. The exact manner in which this system operates to generate impulses contributing to the maintenance of equilibrium is not known. Everyone agrees, however, that the labyrinthine impulses play a part second to the impulses from the muscles, tendons and joints in the sensory phase of balance maintenance. These impulses are generated there when motion occurs and appropriate nerves receive and transmit them to the equilibratory centers in the cerebellum.

Under the influence of normal terrestrial conditions the eye is very seldom called upon to give information concerning the balance of the body in relation to gravity. The principal function of the eye in maintenance of position is in furnishing information as regards orientation, and orientation on the ground is a factor concerning principally the horizontal plane. Normal blindfolded subjects are able to walk for unlimited lengths of time on a smooth field but they soon lose all sense of direction. They usually walk in circles that tend to become smaller. As long as they are standing still or walking at a normal gait, they have a continuous stream of impulses coming from their muscles, tendons, and joints as to their relation to gravity. But, as soon as they begin to run, this stream of impulses is interrupted when both feet are off the ground at the same time, and they soon fall. It was also noted in my experiment that the circle tightened more rapidly when the subjects were trotting. As soon as both feet are off the ground at the same time, the stream of impulses from muscles, tendons and joints lose their reference and can give no information as to position. Since the labyrinthine impulses alone are insufficient for the maintenance of balance, the subjects become unbalanced and they do not know just how to place the feet to meet the ground properly. This is where the eye comes in in the normal maintenance of balance. In addition to supplying information as to orientation on the horizontal plane, it must supply information as to orientation on the two vertical planes.

Under normal conditions, information from all three sources is utilized, and great precision in the maintenance of balance and promptness in righting the body results. The information from muscles, tendons and joints is of first value, that from the labyrinth is second, and that from the eyes third. The eyes assist only by giving information as to orientation. It has been authoritatively stated that balance can be maintained when one of these systems is excluded, but difficulty arises when two are excluded simultaneously. The awkward, foot slapping tabetic has lost only his information from muscles, tendons and joints. His ability to maintain balance is greatly impaired, and as soon as he closes his eyes and removes this second source of information, he falls. A blind tabetic could never walk, because two of his sources of information regarding position are removed.

*The theory of using information received from muscles, tendons and joints in instrument flying*

Instrument flying is accompanied by many varied, unpleasant, and disconcerting mental impressions which the pilot must actually suppress. He must disregard his sensations and believe his instruments even though every normal sensation tells him that his instruments are wrong. By means of his normal balance mechanism, he balances himself against the force that is affecting him, but lacking a fixed point of reference, he is unable to tell the direction of that force. He may feel that he is in balance with gravity while he is actually balanced against the centrifugal force of a turn, or he may feel that he is balanced against the centrifugal force of a turn when he is actually balanced against the force of gravity. We are trained since infancy to rely upon our normal balance mechanism and acting upon information received from the sensory portions of it is a reflex act. Suppressing this usually reliable information in order to believe an instrument that gives different information is a laborious process. Mastering instrument flying requires long periods of intensive training and proficiency in it is maintained only by continuous practce. Even after long periods of training and practice, it is, at best, an un pleasant and rapidly fatiguing task. Furthermore, attention must be so completely focused on the instruments and the act of controlling the airplane that the mind is entirely too busy to properly attend to the many other problems so vital to the safe navigation of aircraft.

Contrast with this the ease with which one maintains his equilibrium and erect posture while on the ground. It requires no mental process; it does not bring unpleasant and false sensations; and it is accompanied by no such fatigue. He employs reflexly a balance mechanism that he has used each working hour since infancy. No human faculty is more highly developed. The well trained airplane pilot uses the same balance mechanism in the air and maintains the balance of the airplane subconsciously with very little more effort than he uses to maintain erect posture while moving on his feet. This is a point that has not been made entirely clear in the literature. All writers on the subject agree that the eye is the sensory portion of the balance mechanism upon which the maintenance of balance in the air finally depends. This is quite true, but no one has explained the exact role played by the eye in this mechanism. Naturally the proprioceptive and vestibular stimuli continue to arrive at the equilibratory centers in the cerebellum, because they are still produced, and there is nothing to stop their passage over the nerve tracts. If they were giving false information under conditions of good visibility, conflicting impressions as to position would arise just as they do when flying by instruments. No conflicting information arises as to position under conditions of good visibility, and we must assume that the information as to position given by the proprioceptive and vestibular portions of the sensory mechanism is correct. What actually happens is that the pilot learns to balance his body against the force that is affecting him, whether it be gravity or the result between gravity and centrifugal force. He is accustomed to balancing his body against the force of gravity. In order to become a trained pilot, he must learn to balance his body, by means of information received from all three sensory sources, against the changing result between the force of gravity and centrifugal force that affects him in aerial maneuvers. This is what is called "the feel of the ship." It has also been termed "flying by the seat of the pants." The proprioceptive and labyrinthine impulses are just as accurate in the air as on the ground and function constantly to tell the pilot whether or not he is in balance with the force affecting him at any moment. The direction of the force affecting the body of the pilot in the air is frequently changing and a constant point of refence is necessary to enable the pilot to determine the direction of the force acting upon his body at any given moment. The eye is the only sensory component of the balance mechanism that can possibly receive information from a fixed source. The eye functions here, just as it does normally on the ground, by supplying information as to orientation. When flying straight and level in smooth air, the body is affected only by gravity. The proprioceptive system and the vestibular apparatus tell the pilot that he is in balance with the force affecting his body. The eyes tell him that the force is perpendicular to the horizontal plane. When the airplane is in a properly banked turn, the proprioceptive system and the vestibular apparatus tell the pilot that his body is balanced against the force affecting him. His eyes tell him the direction of that force. When visual contact is lost, the pilot still knows, from information received from the proprioceptive system and the vestibular apparatus, whether or not his body is balanced against the force affecting him. What he does not know is the direction of that force.

If the pilot could employ his entire normal physiological mechanism of balance while flying "on instruments," just as he does on the ground or in the air under conditions of good visibility, he could fly "on instruments" just as easily as he can with good visibility. He could do it without troublesome false sensations and with as little mental effort as he uses in clear weather. He could maneuver his ship with confidence, and with as much faculty and precision as he does when he sees the ground. To place instrument flying on a physiological basis requires that the pilot have positive information as to the position of the airplane on all three axes. The information as to position on the transverse and horizontal axes should come through the proprioceptive and labyrinthine sources, and information as to position about the vertical axis should come from the eyes, just as it does under normal terrestrial conditions. This is where the system of instrument flying in present use is at fault. It attempts to place the entire responsibility of the maintenance of balance on the eye, the sensory component of the balance mechanism accustomed to giving information as to orientation only. In addition, instead of giving a fixed point of reference, it gives information regarding movement only, and the position of the airplane in relation to the ground must be deduced through a mental process. Since consciousness can entertain only one thought at a time, conscious attention is almost constantly occupied with maintaining the balance of the airplane. In addition to leaving insufficient time for concentration on other problems, essential to the safe navigation of aircraft, it leads rapidly to fatigue.

It is, therefore, the principal object of this invention to provide means by which the task of supplying information as to position about the transverse and horizontal axes may be transferred from the eyes of the pilot to the proprioceptive system.

It is another object of this invention to provide a means which will apply to the body of the pilot sensations so coordinated with the attitude of the ship as to furnish accurate indications of its attitude under most conditions to be encountered in hooded flying.

It is a further object of this invention to provide such a means in a form that is rugged, simple in construction and operation, inexpensive to manufacture and light in weight.

With the foregoing objects in mind, a clear understanding of the invention may be had by a careful consideration of the following specification, taken together with the accompanying drawing, in which:

Fig. 1 is a perspective view of the device;

Fig. 2 is a side elevational view; and,

Fig. 3 is a perspective view of a portion of the device looking from below its point of attachment to the aircraft.

Referring especially to Fig. 1 of the drawing, a plate 1 is shown provided with a clamping means generally indicated by the numeral 10, by means of which it may be rigidly clamped to a fixed portion of the aircraft structure in such a manner as to lie in a horizontal position when the craft is in its normal flying attitude.

A second plate 2 similar in shape to the first is mounted above it and connected thereto by means of three rods 3 of equal length. The ends of these rods are connected to their respective plates by means of "split-ball" type universal joints 4 which are secured by keying into fittings 9. These fittings are in turn secured to the plates 1 and 2 in such a manner as to prevent rotary movement of the fitting with respect to the plate. This is done by forming each fitting with a cylindrical extension which is swaged into a hole in the plate.

Below the plate 1 a weight 5 is swung, being rigidly secured to the lower end of a rod 6, the upper end of which is secured by means of a universal joint 4 of the same type as those described above, to a fitting 12 which also is of the same type as those fittings 9 described above in connection with the rods 3.

Rigidly secured to the rod 6 near its upper end is an offset arm 7 to which is rigidly attached a rod 8, which serves in effect as an upwardly extending but offset continuation of the rod 6. The rod 8 passes through holes 13 and 14 formed in the plates 1 and 2 respectively, and located in the central portion of their respective plates. The holes 13 and 14 are made enough larger than the rod 8 to allow the rod some play therein.

This arrangement allows any lateral movement of the weight 5 to cause a corresponding lateral movement in the opposite direction of the plate 2 with respect to plate 1. The flexibility of the device is such that a movement through an arc of about 80 degrees is permitted the plate 2 and the weight 5.

The operation of the device

The device is designed to stimulate the proprioceptive senses in the left arm and permit the ship to be balanced against the forces affecting it by following the motions of the left hand by corresponding motions of the right hand which is on the stick. It is clamped to a fixed part of the ship in such a position that the pilot's left hand lies naturally upon it. In flight, the pilot grasps the upper portion of rod 8 loosely with the fingers of his left hand, allowing the hand to rest upon the top of plate 2. In the air, the pilot utilizes the indications of the device by bringing pressure on the stick in the direction of the movement of the left hand until the left hand on the rod and plate has come back to normal position. No mental process is required to make the right hand follow the left in doing this. The motions appreciated by the left arm and hand are: first, the movement of the plate, and second, the angular motion of the control rod about the plate. Movement of the plate, from side to side and back and forth, stimulates the muscles of the arm and shoulder, and the elbow and shoulder joints. Angular motion of the control rod in relation to the plates stimulates the muscles of the forearm and hand and the wrist and finger joints. This provides sufficient proprioceptive stimulation for the accurate perception of a motion in any direction. This enables the ship to be balanced correctly against the forces of gravity and centrifugal force of turns by simply moving the two hands in unison, following the motions of the left hand with similar motions of the right. Attention needs to be focused only on keeping the airplane in a straight path by means of the rudder.

Action of the device in level flight

In straight and level flight a straight course is maintained with the rudder while observing the gyroscopic compass. As long as the ship continues in a straight line, the weight is affected only by gravity. If a wing falls, the weight 5 is pulled in the direction of that wing by gravity, the control rod 8 and plate 2 move in the opposite direction making the opposite angle between the control rod and the plate decrease, and indicating through the feel in the left hand and arm that motion in the same direction is required on the stick to bring the wing up. If the ship assumes a constant dive or climb, the control rod and plate move in the direction of the corrective stick motion necessary and the angle between the plate and control rod is decreased in that direction. In order to maintain level flight, it is only necessary to keep the ship in a straight line with the rudder and follow the movements of the left hand with the right.

Action of the device in turns

When a turn is started with the rudder, the centrifugal force of the turn throws the weight to the outside. The plate 2 and control rod 8 are moved to the inside and the inside angle between the control rod and the plate is decreased. This motion is transmitted to the left hand and indicates that a corresponding motion of the right hand is necessary to balance the airplane against the centrifugal motion of the turn. Again it is only necessary to follow the left hand with the right. In coming out of turns, the airplane can be kept in constant balance against the changing centrifugal force by leading with the rudder and following the left hand with the right just as when going into the turn.

The exact position of the nose of the airplane on the horizon is given by back and forth motion of the plate 2 and change in the angle between the plate and the rod when in climbs and dives. When the nose of the airplane is falling, this motion is amplified by the centrifugal force of the downward turn pulling the weight toward the front of the ship. This is held to be an advantage as in actual instrument flight it is important to prevent dives from beginning. A student at the Army Advanced Flying School at Kelly Field recently went into a dive so fast that the safety pilot was thrown from the cockpit by the centrifugal force and the student dove on into the ground. This accident would have been impossible with the present device because both gravity and the centrifugal force would have acted on the device to tell the pilot that backward movement of the stick was imperative. When pulling out of dives, the action of this device in giving the correct position of the nose of the airplane in respect to the horizon is impeded by the centrifugal force of the pull-out overcoming the effect of gravity. This is compensated for by watching the sensitive hand on the altimeter and continuing the pull-out until the altimeter begins to register a climb. The same method is used in steep banks to aid in keeping the nose of the airplane on the horizon.

The invention described herein may be manufactured and/or used by or for the Government of the United States of America for governmental purposes without the payment of any royalties thereon or therefor.

I claim:

1. A device of the class described, comprising a first plate, means to secure said plate to a fixed part of the structure of an aircraft and to maintain it in fixed relation thereto, a second plate located above said first plate, means linking said second plate to said first plate, in such a manner that every point of said second plate may describe an arcuate path about a corresponding point in said first plate at a constant distance therefrom, while said plates remain parallel to each other, a pendulum suspended from said first plate, and an extension rigidly secured to the rod of said pendulum and extending upwardly through holes formed in said plates, said holes being slightly larger than said extension, whereby angular movement of said pendulum in any direction about said pivot point will cause an equal and opposite angular movement of said extension about said pivot point.

2. A device of the class described, comprising a pendulum mounted to swing about a universal pivot point, means to fix said device in an aircraft, a plate, means supporting said plate above said pivot point for parallel movement with respect to a plane passing through said pivot point and normal to the position occupied by the axis of said pendulum when said craft is in normal level flight, a hole in said plate, and an extension member formed on the rod of said pendulum and extending upwardly from said pivot point to pass through said hole and extend above said plate.

3. A device of the class described, comprising a pendulum mounted to swing about a universal pivot point, means to fix said device in an aircraft, means forming an extension of the rod of said pendulum and extending upwardly from said pivot point, a plate, and means supporting said plate above said pivot point and maintaining said plate normal to the position occupied by said pendulum when said aircraft is in normal level flight, said plate being formed with a hole slightly larger than said extension, said extension passing through said hole and extending above said plate, said plate being freely movable in such directions as to allow unrestricted movement of said pendulum and said extension through a predetermined range of movement about said pivot point.

4. A device of the class described, comprising a first plate, means to secure said plate to a fixed part of the structure of an aircraft and to maintain it is fixed relation thereto, a second plate located above said first plate, a plurality of linking means connecting said second plate to said first plate, said linking means being of equal length, a universal joint connecting each end of each of said linking means to its respective one of said plates, a pendulum, a universal joint connecting said pendulum to the lower side of said first plate, and an extension means rigidly secured to the rod of said pendulum, extending upwardly therefrom above the pivot point of said pendulum and passing through holes formed in each of said plates, said holes being sufficiently larger in cross-section than said extension to allow free relative angular motion therebetween.

5. A device of the class described, comprising a pendulum mounted to swing about a universal pivot point, means to fix said device in an aircraft, a plate, means supporting said plate above said pivot point for parallel movement with respect to a plane passing through said pivot point and normal to the position occupied by the axis of said pendulum when said craft is in normal level flight, and means forming an upwardly directed extension of the rod of said pendulum, said extension extending above said plate, said plate and said extension being so connected that said plate will follow any angular movement of said extension about said pivot point, within a predetermined range of said movements, with a corresponding lateral movement in the same direction.

NORMAN LEE BARR.